(12) United States Patent
Okada et al.

(10) Patent No.: US 7,161,583 B2
(45) Date of Patent: Jan. 9, 2007

(54) INPUT DEVICE AND METHOD FOR DETECTING CONTACT POSITION

(75) Inventors: Hiroyasu Okada, Hyogo (JP); Hiroto Inoue, Kyoto (JP); Masaki Sawada, Osaka (JP); Tamotsu Yamamoto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 444 days.

(21) Appl. No.: 10/725,594

(22) Filed: Dec. 3, 2003

(65) Prior Publication Data
US 2004/0135769 A1    Jul. 15, 2004

(30) Foreign Application Priority Data
Dec. 4, 2002   (JP)   ............................. 2002-352393

(51) Int. Cl.
G09G 5/08   (2006.01)
(52) U.S. Cl. .......................................... 345/157; 338/47
(58) Field of Classification Search ........ 345/145–157, 345/159–167, 173–175, 184; 338/47, 49, 338/92–93, 95, 97, 99
See application file for complete search history.

(56) References Cited

U.S. PATENT DOCUMENTS 5,912,612 A * 6/1999 DeVolpi ...................... 338/95
6,259,436 B1 * 7/2001 Moon et al. ................. 345/173
6,437,682 B1 * 8/2002 Vance ......................... 338/185
6,653,579 B1   11/2003 Inoue et al.
6,794,982 B1    9/2004 Inoue et al.

FOREIGN PATENT DOCUMENTS

JP   2002-117750   4/2002
JP   2002-117751   4/2002

* cited by examiner

*Primary Examiner*—Richard Hjerpe
*Assistant Examiner*—Mansour M. Said
(74) *Attorney, Agent, or Firm*—Wenderoth, Lind & Ponack, L.L.P.

(57) ABSTRACT

An input device of the present invention includes a substantially ring-shaped resistor including two pair of electrodes projecting along a Y direction and an X direction orthogonal to the Y direction, a substantially ring-shaped conductor facing the resistor across a clearance, and a controller for successively applying a voltage between the pair of electrodes along the X direction and between the pair of electrodes along the Y direction when the resistor and the conductor contact each other due to pressing. The controller determines an angle which a pressed position makes with high precision, from one of a resultant vector of vectors that are directed in the respective X and Y directions and detected based on voltages output from the conductor when the voltage is applied in the X and Y directions, and a mean value of angles detected based on the conductor's output voltages.

5 Claims, 8 Drawing Sheets

FIG. 10 PRIOR ART
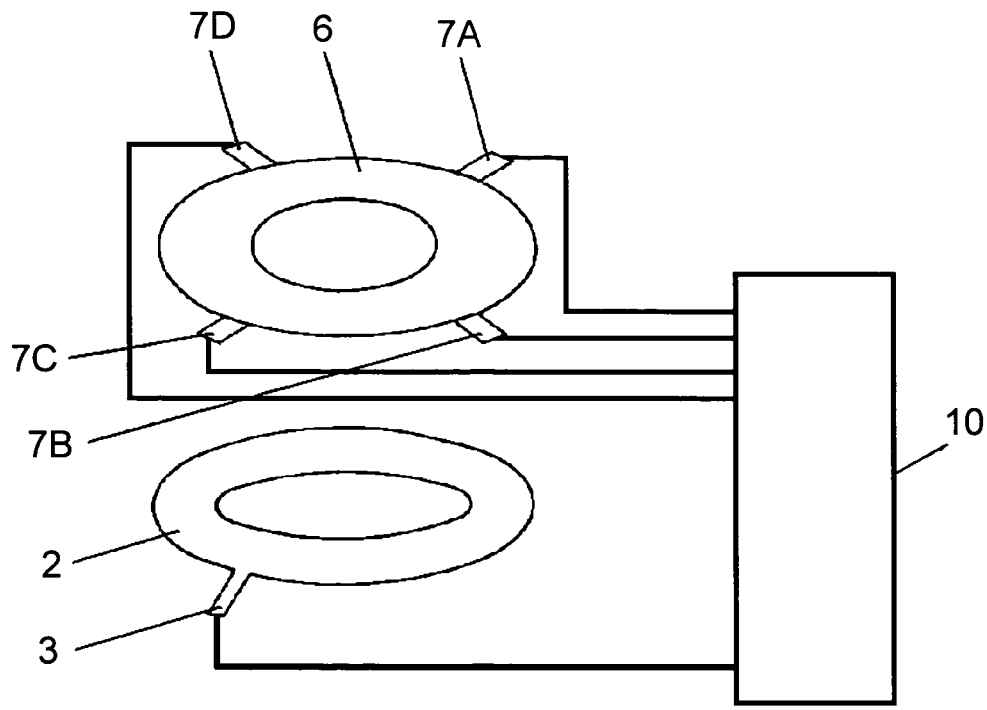
FIG. 11A
PRIOR ART
FIG. 11B
PRIOR ART
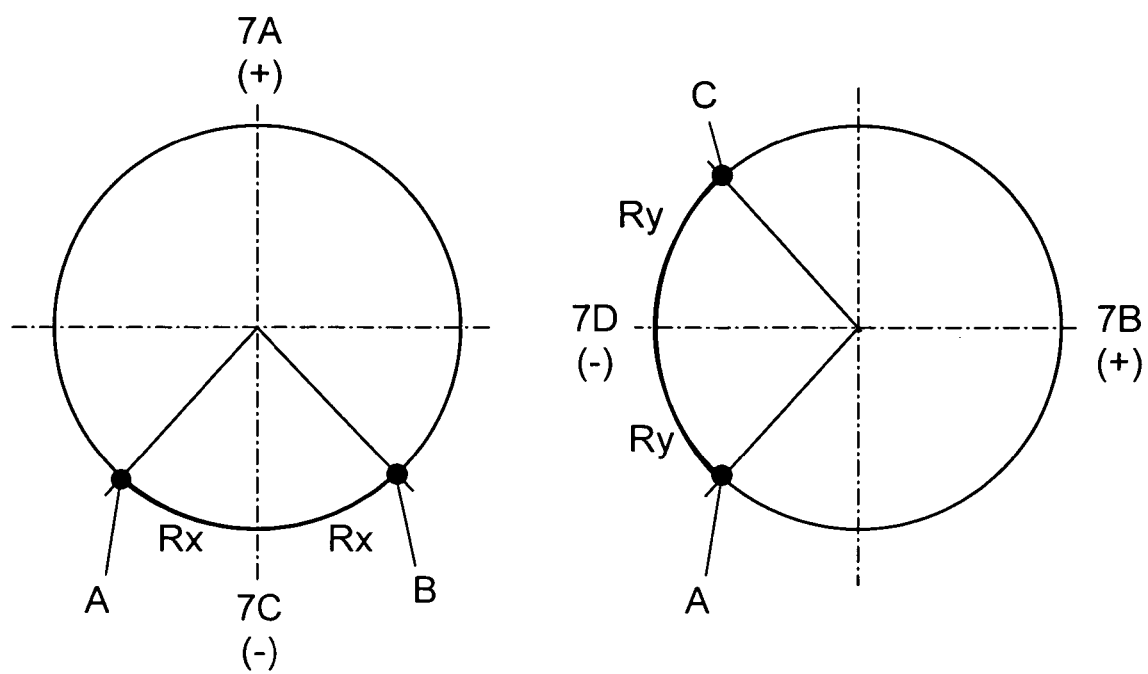

FIG. 12A
PRIOR ART
FIG. 12B
PRIOR ART
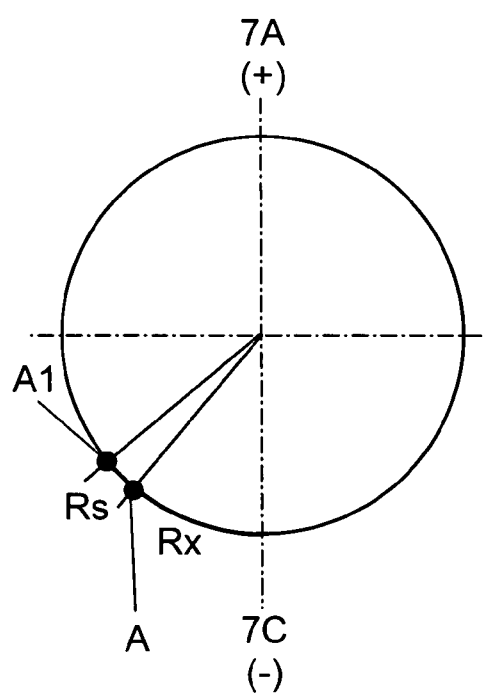
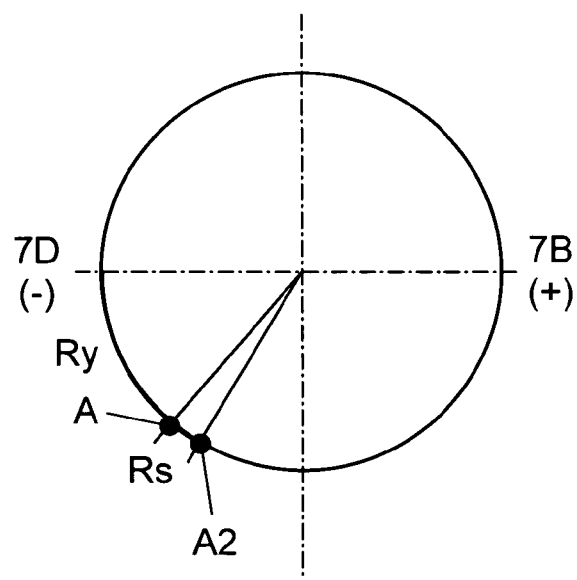

INPUT DEVICE AND METHOD FOR DETECTING CONTACT POSITION

BACKGROUND OF THE INVENTION

1. Field of the Invention

The present invention relates to an input device used in a variety of electronic apparatuses including a portable telephone and a portable information device such as a note type personal computer or a personal digital assistant and also relates to a method for detecting a position of contact between a resistor and a conductor of the input device.

2. Background Art

Recently, various electronic apparatuses including a portable telephone and a portable information device have become more functional. These electronic apparatuses use an input device having a planar pad or a trackball that is operated to move a cursor or a pointer on a display screen for input or selection of various pieces of information. Such an input device requires highly precise detection of an operated position or a press angle.

Referring to FIGS. 10 through 12B, a description will be provided hereinafter of such a conventional input device. FIG. 10 is a conceptual illustration of the conventional input device. Substantially ring-shaped resistor 6 includes, at its outer periphery, a pair of electrodes 7A, 7C projecting in a Y direction and a pair of electrodes 7B, 7D projecting in an X direction orthogonal to the Y direction. Substantially ring-shaped conductor 2 faces resistor 6 across a given clearance and includes, at its outer periphery, electrode 3 projecting in a specified direction. These electrodes 7A to 7D and 3 are connected to controller 10 such as a microcomputer. In this way, the input device is constructed.

A description will now be provided of a method for detecting the press angle when a specified part of the input device having the above structure is pressed.

As shown in a conceptual illustration of FIG. 11A, when the pressed position is, for example, point A, controller 10 applies a voltage with electrodes 7C, 7A rendered negative and positive, respectively, and detects, from electrode 3, a voltage corresponding to fixed resistance Rx between point A and electrode 7C. In this way, controller 10 detects point A, which is located fixed resistance Rx away in a clockwise direction from the negative electrode along the Y direction, or point B, which is located fixed resistance Rx away in a counterclockwise direction from the negative electrode along the Y direction, as the pressed position.

Next, as shown in FIG. 11B, controller 10 applies a voltage with electrodes 7D, 7B rendered negative and positive, respectively. Controller 10 then detects, from electrode 3, a voltage corresponding to fixed resistance Ry between point A and electrode 7D. In this way, controller 10 detects point C, which is located fixed resistance Ry away in the clockwise direction from the negative electrode along the X direction, or point A, which is located fixed resistance Ry away in the counterclockwise direction from the negative electrode along the X direction, as the pressed position. Based on these detections, controller 10 judges that point A, which is common to the detections in X and Y directions, is pressed and determines a press angle which point A makes. Based on the press angle, the cursor or pointer is moved on the display screen for input or selection of the various pieces of information.

However, there normally is contact resistance Rs where resistor 6 and conductor 2 contact each other, in addition to the above-described fixed resistances Rx, Ry of resistor 6. Using conceptual illustrations of FIGS. 12A and 12B, a description will be provided next of this case.

First, controller 10 applies a voltage with electrodes 7C, 7A rendered negative and positive, respectively. At that time, controller 10 detects, as the pressed position, point A1 located contact resistance Rs away from point A, namely located contact resistance Rx+Rs away in the clockwise direction from the negative electrode along the Y direction. Next, controller 10 applies a voltage with electrodes 7D, 7B rendered negative and positive, respectively, and detects, as the pressed position, point A2 located contact resistance Rs away from point A, namely located contact resistance Ry+Rs away in the counterclockwise direction from the negative electrode along the X direction. Controller 10 then judges that one of detected pressed positions A1, A2 is the pressed position. Such an input device is disclosed, for example, in Japanese Patent Unexamined Publication No. 2002-117750.

In the conventional input device described above, due to contact resistance Rs caused between resistor 6 and conductor 2, point A1 or A2 is detected as the actual pressed position, namely point A. This means that the detection of the press angle tends to involve an error.

SUMMARY OF THE INVENTION

An input device of the present invention includes a substantially ring-shaped resistor, which is provided with a pair of electrodes projecting from an outer periphery of the resistor along a Y direction and a pair of electrodes projecting from the outer periphery of the resistor along an X direction orthogonal to the Y direction, and a substantially ring-shaped conductor facing the resistor across a given clearance. The input device also includes a controller for successively applying a voltage between the pair of electrodes along the X direction and between the pair of electrodes along the Y direction when one of the resistor and the conductor is brought into contact with the other by pressing. The controller detects vectors in the respective X and Y directions based on voltages output from the conductor when the voltage is applied in the X and Y directions and determines, from a resultant vector of these vectors, an angle which a position of contact between the resistor and the conductor makes. Alternatively, the controller detects angles based on the respective output voltages of the conductor and determines, from a mean value of these angles, the angle which the contact position between the resistor and the conductor makes.

BRIEF DESCRIPTION OF THE DRAWINGS

FIG. 10 is a conceptual illustration of a conventional input device.

FIGS. 11A, 11B, 12A and 12B are conceptual illustrations of the conventional input device undergoing pressing.

DETAILED DESCRIPTION OF THE INVENTION

Exemplary embodiments of the present invention are demonstrated hereinafter with reference to the accompanying drawings. It is to be noted that the same reference marks are used for the same or similar elements, and the descriptions of those elements are simplified in the later embodiment.

First Exemplary Embodiment

Figure 1:
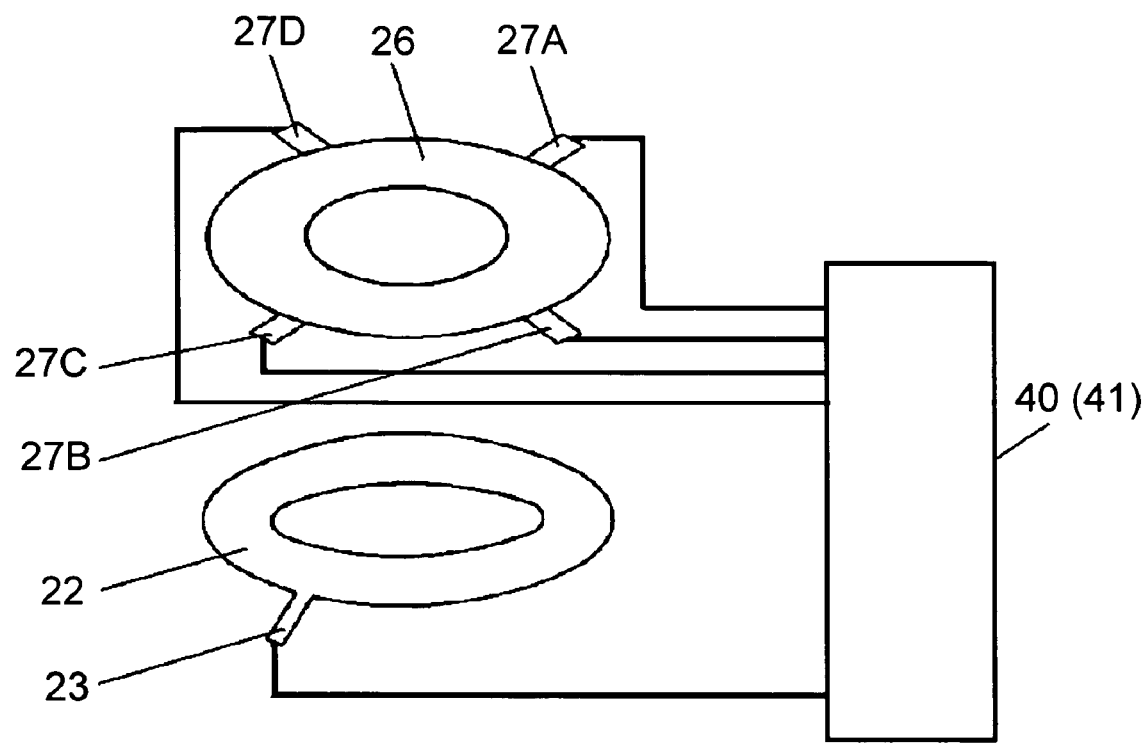
FIG. 1 is a conceptual illustration of an input device in accordance with a first and a second exemplary embodiments of the present invention.

FIG. 1 is a conceptual illustration of an input device in accordance with a first exemplary embodiment of the present invention. Substantially ring-shaped resistor 26 is made of carbon or the like and has, at its outer periphery, a pair of electrodes 27A, 27C projecting in a Y direction and a pair of electrodes 27B, 27D projecting in an X direction orthogonal to the Y direction. Substantially ring-shaped conductor 22 is a good conductor made of copper or the like, faces resistor 26 across a given clearance and has, at its outer periphery, electrode 23 projecting in a specified direction. These electrodes 27A to 27D and 23 are connected to controller 40 such as a microcomputer.

Figure 2:
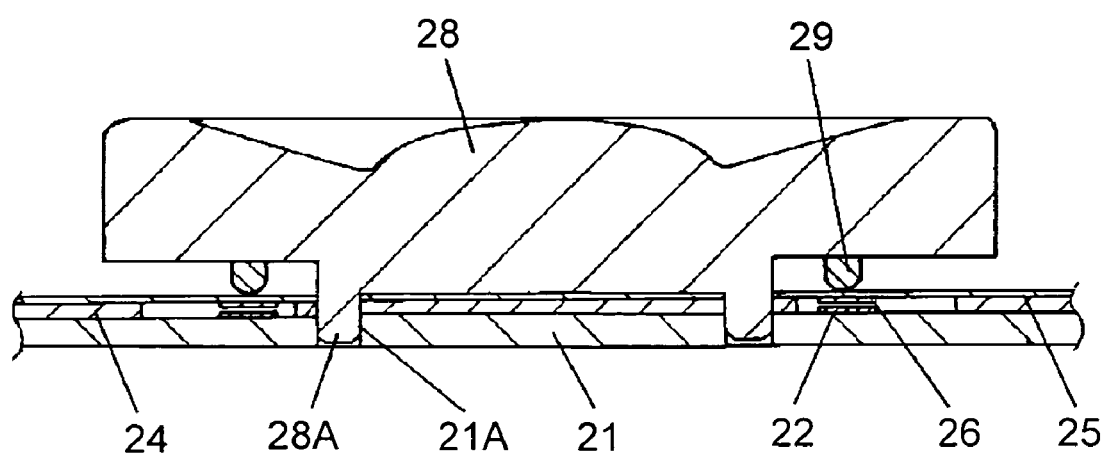
FIG. 2 is a sectional view of the input device of FIG. 1.
Figure 3:
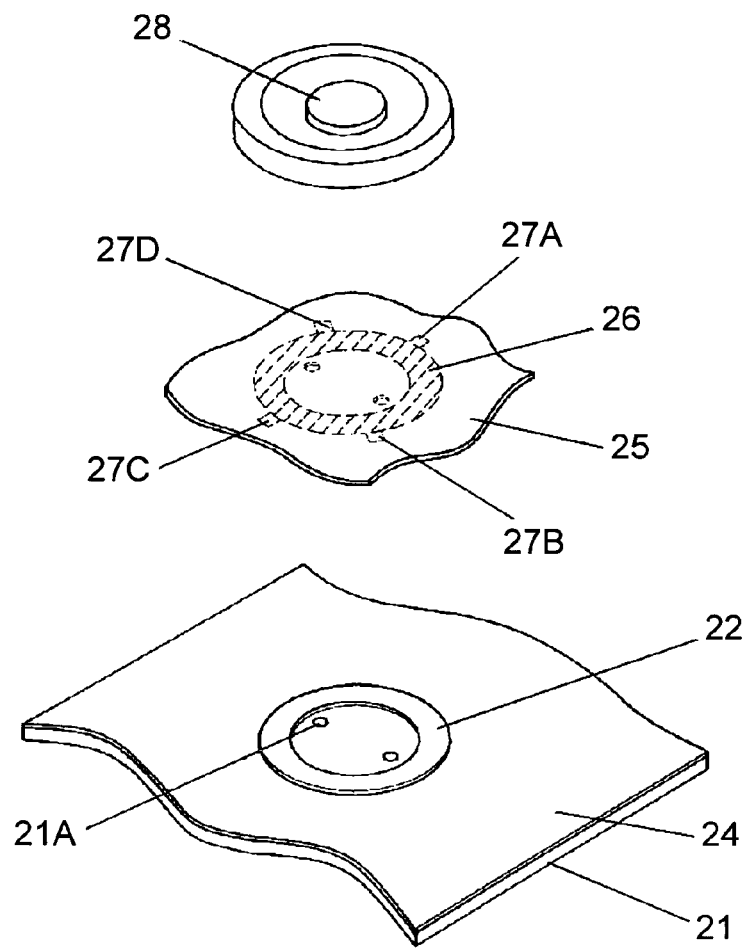
FIG. 3 is an exploded perspective view of the input device of FIG. 1.

As shown in FIGS. 2 and 3, conductor 22 is formed on a top surface of insulating substrate 21. Resistive sheet 25 is provided above insulating substrate 21, and resistor 26 is formed on a surface of sheet 25 that faces conductor 22. Insulating substrate 21 is formed with a plurality of wiring patterns (not shown) at its top and bottom surfaces. Resistive sheet 25 is formed of a flexible film of polyethylene terephthalate or the like.

Spacer 24 having a through hole in the center thereof is placed between insulating substrate 21 and resistive sheet 25, so that conductor 22 faces resistor 26 across the given clearance.

Substantially disc-shaped operating member 28 is provided above resistive sheet 25 and has, in the vicinity of the center of its bottom surface, two bosses 28A forcibly fixed into respective holes 21A of insulating substrate 21. This operating member 28 is made of, for example, elastic rubber or elastomer. Ring-shaped projection 29 projects from a border of the bottom surface of operating member 28 and has a round end contacting a top surface of resistive sheet 25 above conductor 22. In this way, the input device is constructed. With operating member 28 thus provided, resistor 26 can be brought into contact with conductor 22 without fail by pressing resistive sheet 25 provided with resistor 26 directly with a user's finger or the like. Providing projection 29 at the border of the bottom surface of operating member 28 allows highly precise selection because any pressed position lies within a limited range.

A description will be provided hereinafter of a method for detecting a press angle when a specified part of a top surface of operating member 28 of the above structure is pressed.

Figure 4:
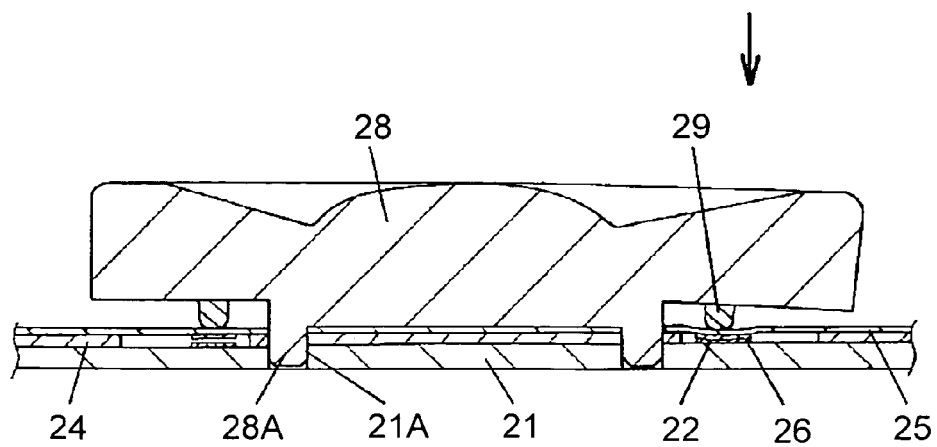
FIG. 4 is a sectional view of the input device of FIG. 1 undergoing pressing.

When the outer portion of the top surface of operating member 28 is pressed by a given force of a finger or the like, operating member 28 tilts as shown in FIG. 4, whereby projection 29 presses resistive sheet 25 which thus bows downward. Accordingly, resistor 26 on the bottom surface of resistive sheet 25 is brought into contact with opposing conductor 22, thus effecting electrical conduction between resistor 26 and conductor 22. A signal indicative of this electrical conduction is output from electrode 23 to controller 40.

Figure 5A:
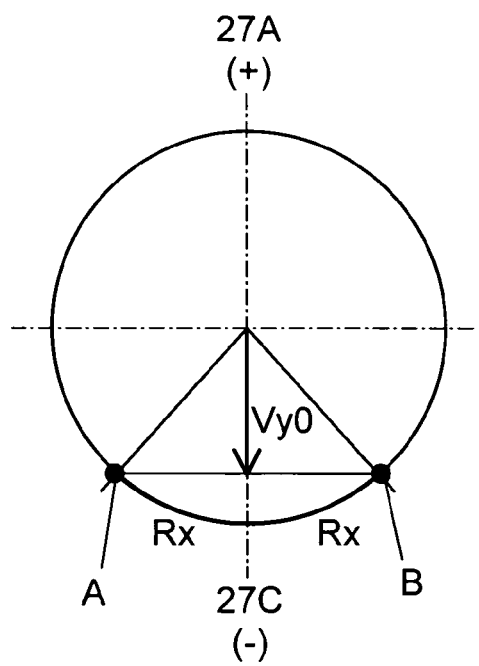
FIGS. 5A through 5C and FIGS. 6A through 6C are conceptual illustrations of pressed point A of the input device in accordance with the first embodiment of the present invention.

In a case where lower-left point A shown in FIG. 5A is pressed, controller 40 applies a voltage with electrodes 27C, 27A rendered negative and positive, respectively. Based on a voltage output from electrode 23, controller 40 detects lower-left point A or lower-right point B as the pressed position and finds vector Vy0 directed in the Y direction.

Figure 5B:
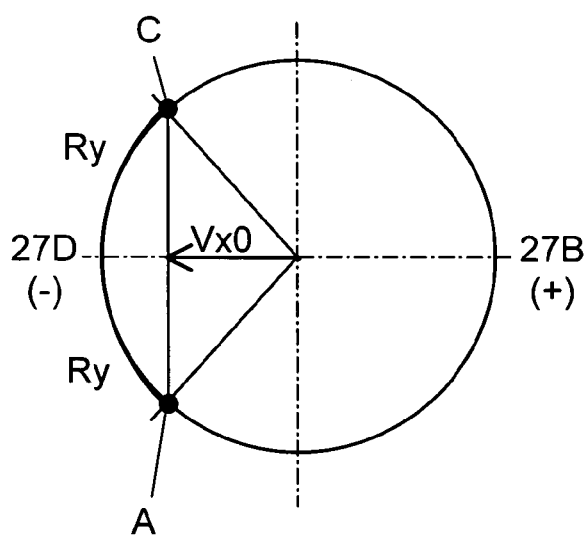

Next, controller 40 applies a voltage with electrodes 27D, 27B rendered negative and positive, respectively, as shown in FIG. 5B, detects upper-left point C or lower-left point A as the pressed position and thus finds vector Vx0 directed in the X direction.

Figure 5C:
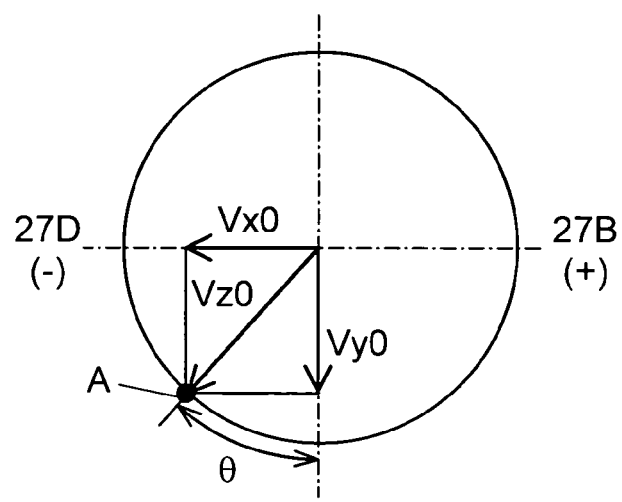

Thereafter, based on resultant vector Vz0 of vectors Vx0, Vy0 as shown in FIG. 5C, controller 40 detects angle θ which point A forms as the press angle which the pressed position forms.

A description will be provided next of a method for detecting a press angle when there is contact resistance Rs where resistor 26 and conductor 22 contact each other.

Figure 6A:
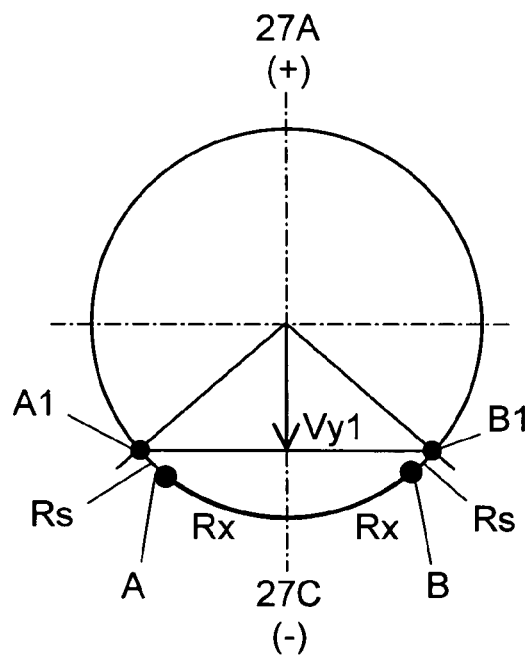

First, controller 40 applies a voltage with electrodes 27C, 27A rendered negative and positive, respectively, as shown in FIG. 6A. Based on a voltage output from electrode 23, controller 40 detects point A1, which is located contact resistance Rs away in an upper-left direction from lower-left point A, or point B1, which is located contact resistance Rs away in an upper-right direction from lower-right point B, as the pressed position and thus finds vector Vy1 directed in the Y direction.

Figure 6B:
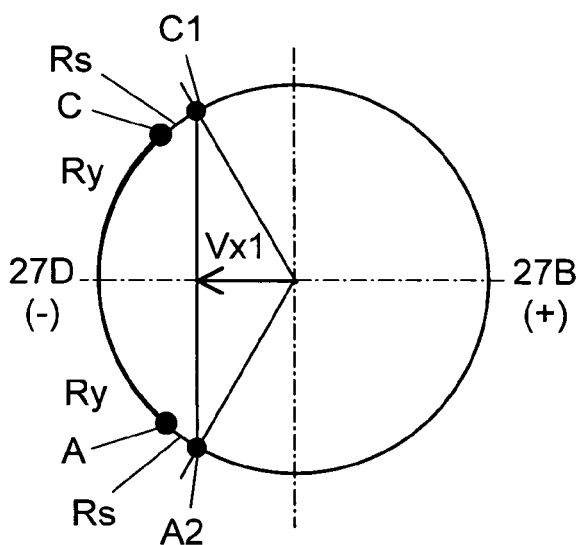

Next, controller 40 applies a voltage with electrodes 27D, 27B rendered negative and positive, respectively, as shown in FIG. 6B. Controller 40 then detects point C1, which is located contact resistance Rs away in the upper-right direction from upper-left point C, or point A2, which is located contact resistance Rs away in a lower-right direction from lower-left point A, as the pressed position and thus finds vector Vx1 directed in the X direction.

Figure 6C:
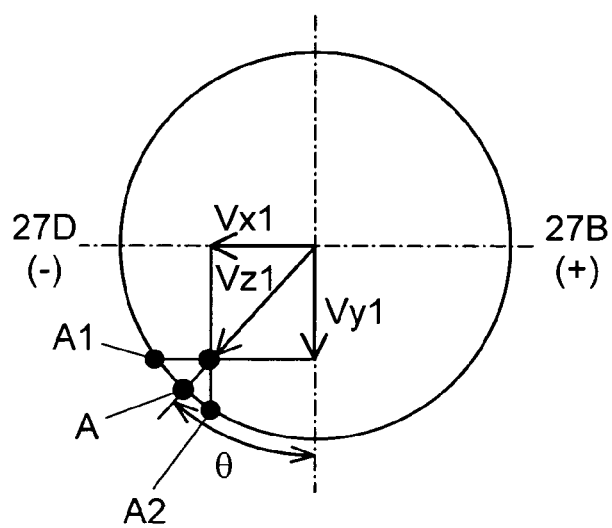

Thereafter, controller 40 adds vector Vx1 and vector Vy1 as shown in FIG. 6C and detects angle θ obtained from resultant vector Vz1 as the press angle which the pressed position forms. It is to be noted here that angle θ which vector Vz1 forms is the same as the angle which vector Vz0 not including contact resistance Rs forms. In this way, controller 40 performs precise detection of angle θ which point A forms as the press angle which the pressed position forms, by eliminating a press angle error equivalent to contact resistance Rs. Based on press angle θ detected, a cursor or a pointer is moved on a display screen for input or selection of various pieces of information.

According to the present embodiment described above, controller 40 successively applies the voltage between the pair of electrodes along the X direction and between the pair of electrodes along the Y direction and detects the vectors directed in the respective X and Y directions based on the voltages output from conductor 22 when the voltage is applied in the X and Y directions. From the resultant vector of these vectors, controller 40 determines the press angle which the pressed position forms. The input device thus formed performs detection of the press angle that is unaffected by contact resistance Rs between resistor 26 and conductor 22. Accordingly, the input device obtained is capable of highly precise detection of the press angle.

Figure 7A:
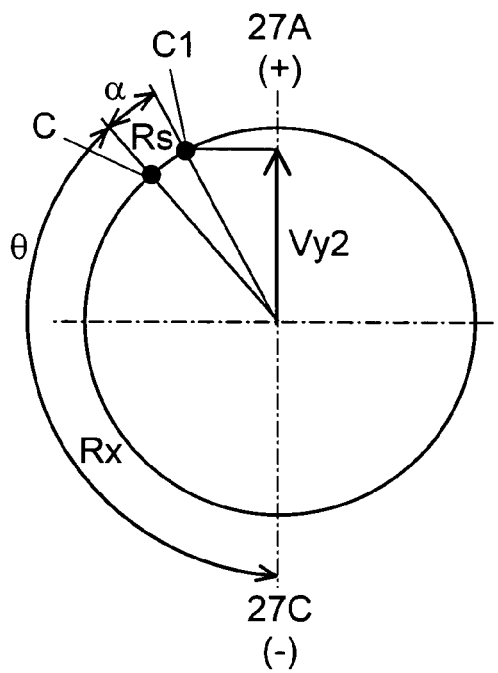
FIGS. 7A through 7D are conceptual illustrations of pressed point C of the input device in accordance with the first and second embodiments of the present invention.

In a case where upper-left point C shown in FIG. 7A is pressed, and contact resistance Rs is caused between resistor 26 and conductor 22 in this pressed position, a press angle is detected in the following manner.

First, controller 40 applies a voltage with electrodes 27C, 27A rendered negative and positive, respectively, and detects vector Vy2 directed in the Y direction for point C1, which is located contact resistance Rs away in the upper-right direction from upper-left pressed position, namely point C.

Figure 7B:
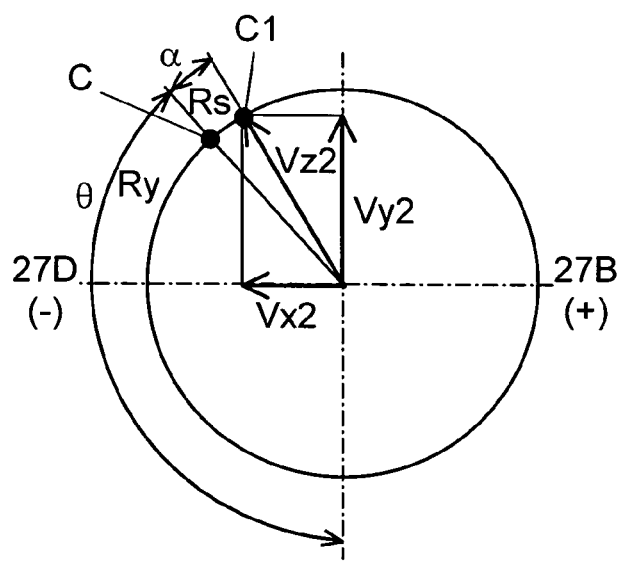

Next, controller 40 applies a voltage with electrodes 27D, 27B rendered negative and positive, respectively, as shown in FIG. 7B and detects vector Vx2 directed in the X direction for point C1.

Thereafter, controller 40 adds vector Vx2 and vector Vy2 and detects, as the press angle which the pressed position makes, angle θ+α which resultant vector Vz2, namely point C1 makes. In other words, although controller 40 has determined the press angle from resultant vector Vz2, controller 40 has detected, as the press angle, angle θ+α which point C1 including contact resistance Rs makes (rather than the correct angle θ which point C makes).

Figure 7C:
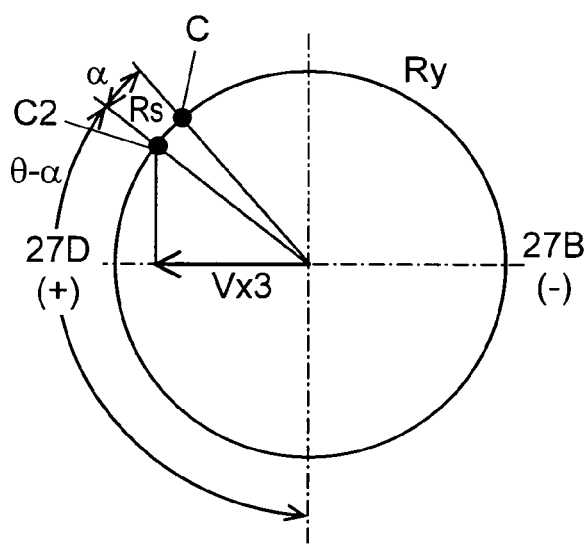

In this case, controller 40 subsequently applies a voltage with the polarity of the voltage along, for example, the X direction reversed as shown in FIG. 7C. In other words, controller 40 applies the voltage with electrodes 27D, 27B rendered positive and negative, respectively, and detects vector Vx3 directed in the X direction for point C2, which is located contact resistance Rs away in a lower-left direction from upper-left pressed position, namely point C.

Figure 7D:
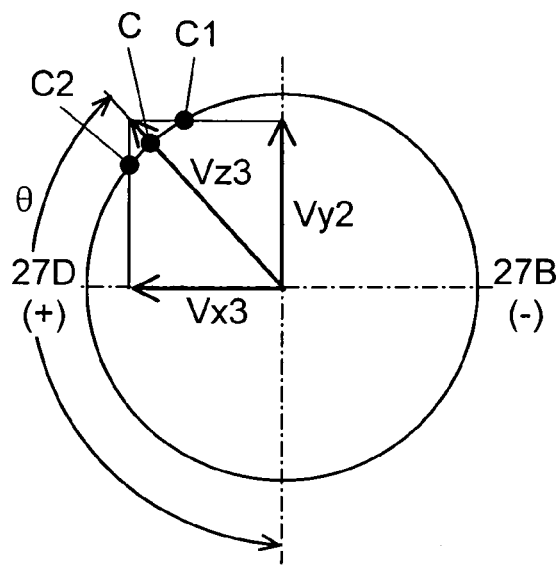

Thereafter, controller 40 adds vector Vx3 and vector Vy2 as shown in FIG. 7D and detects press angle θ obtained from resultant vector Vz3 as the press angle which the pressed position makes. In other words, controller 40 performs precise detection of angle θ which point C forms as the press angle which the pressed position forms, by eliminating an angle error equivalent to contact resistance Rs.

As described above, the press angle is preferably detected again by applying the voltage with the polarity of the voltage along the X or Y direction reversed. Controller 40 can thus detect, with higher precision, the press angle which every pressed position makes, without being affected by contact resistance Rs.

Second Exemplary Embodiment

The structure of an input device in accordance with the present embodiment is similar to that of the first embodiment except with respect to a controller. In other words, as shown in FIGS. 1 through 3, substantially ring-shaped resistor 26 faces substantially ring-shaped conductor 22 across a given clearance. This resistor 26 has, at its outer periphery, a pair of electrodes 27A, 27C projecting in a Y direction and a pair of electrodes 27B, 27D projecting in an X direction orthogonal to the Y direction. Conductor 22 has electrode 23 projecting in a specified direction. In this embodiment, these electrodes 27A to 27D and 23 are connected to controller 41, such as a microcomputer, and which has a different method for detecting a press angle. In this way, the input device is constructed.

A description will be provided hereinafter of the method for detecting the press angle when a specified part of a top surface of operating member 28 of the above structure is pressed.

When operating member 28 tilts and presses a top surface of resistor 26 with given force as shown in FIG. 4, resistor 26 is brought into contact with conductor 22 opposite, thus effecting electrical conduction between resistor 26 and conductor 22. As in the case of the first embodiment, a signal indicative of this electrical conduction is output from electrode 23 to controller 41.

Figure 8A:
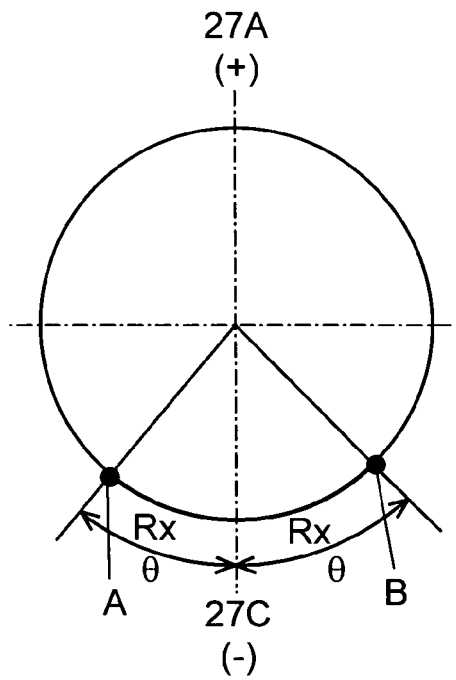
FIGS. 8A, 8B, 9A and 9B are conceptual illustrations of pressed point A of the input device in accordance with the second embodiment of the present invention.

In cases where lower-left point A shown in FIG. 8A is pressed, controller 41 applies a voltage with electrodes 27C, 27A rendered negative and positive, respectively. Based on a voltage output from electrode 23, controller 41 detects angles θ from the negative electrode along the Y direction. In other words, controller 41 detects lower-left point A or lower-right point B as the pressed position.

Figure 8B:
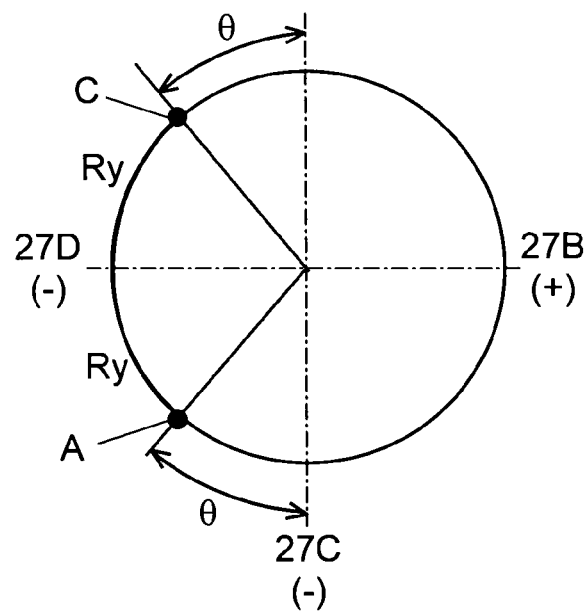

Next, controller 41 applies a voltage with electrodes 27D, 27B rendered negative and positive, respectively, as shown in FIG. 8B, and detects an angle from the positive electrode along the Y direction as θ and detects an angle from the negative electrode along the Y direction as θ. In other words, controller 41 detects upper-left point C or lower-left point A as the pressed position. Based on these detections, controller 41 detects angle θ which point A common in the detections makes as the press angle which the pressed position makes.

It is to be noted that controller 41 does not adopt either angle θ between electrode 27C and point A of FIG. 8A or angle θ between electrode 27C and point A of FIG. 8B, but determines a mean value of these angles θ as the press angle which the pressed position makes.

A description will be provided next of a method for detecting a press angle when there is contact resistance Rs where resistor 26 and conductor 22 contact each other.

Figure 9A:
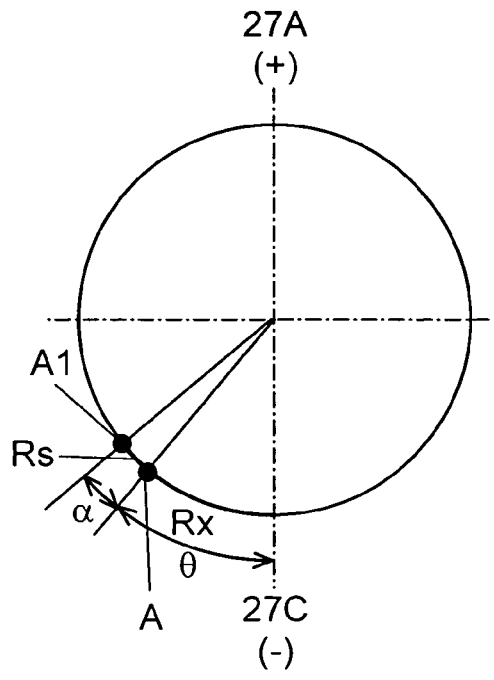

First, controller 41 applies a voltage with electrodes 27C, 27A rendered negative and positive, respectively, as shown in FIG. 9A. Based on a voltage output from electrode 23, controller 41 detects an angle from the negative electrode along the Y direction as θ+α which is obtained by adding angle α equivalent to contact resistance Rs to angle θ which point A makes. In other words, controller 41 detects point A1, which is located contact resistance Rs away in an upper-left direction from lower-left point A, as the pressed position.

Figure 9B:
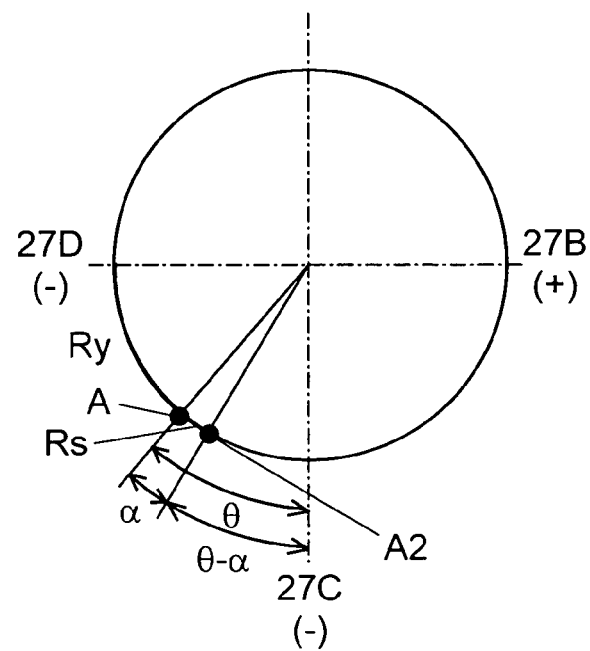

Thereafter, controller 41 applies a voltage with electrodes 27D, 27B rendered negative and positive, respectively, as shown in FIG. 9B and detects an angle from the negative electrode along the Y direction as θ−α which is obtained by deducting angle α equivalent to contact resistance Rs from angle θ which point A makes. In other words, controller 41 detects point A2, which is located contact resistance Rs away in a lower-right direction from lower-left point A, as the pressed position.

In the present embodiment, the mean value of the angle obtained by the application of the voltage in the X direction and the angle obtained by the application of the voltage in the Y direction is detected as the press angle which the pressed position makes. Accordingly, controller 41 detects, as the press angle which the pressed position makes, a mean value of the angle obtained by the application of the voltage in the X direction and the angle obtained by the application of the voltage in the Y direction. In other words, controller 41 detects mean value θ of angle θ−α which point A2 forms and angle θ+α which point A1 forms as the press angle which the pressed position forms.

In this way, controller 41 performs precise detection of angle θ which point A forms as the press angle which the pressed position forms, by eliminating an angle error equivalent to contact resistance Rs. Based on press angle θ detected, a cursor or a pointer is moved on a display screen for input or selection of various pieces of information.

According to the present embodiment described above, controller 41 successively applies the voltage between the pair of electrodes along the X direction and between the pair of electrodes along the Y direction and based on the voltages output from conductor 22 when the voltage is applied in the X and Y directions, detects mean value θ of angles θ−α, θ+α, which are obtained by the application of the voltage in the X and Y directions, as the press angle which the pressed position forms. The input device thus formed performs detection of the press angle that is unaffected by contact resistance Rs between resistor 26 and conductor 22. Accordingly, the input device obtained is capable of highly precise detection of the press angle.

In a case where upper-left point C shown in FIG. 7A is pressed, and contact resistance Rs is caused between resistor 26 and conductor 22 in this pressed position, a press angle is detected in the following manner.

First, controller 41 applies a voltage with electrodes 27C, 27A rendered negative and positive, respectively, and detects point C1, which is located contact resistance Rs away in an upper-right direction from upper-left point C, as the pressed position.

Even when controller 41 applies a next voltage with electrodes 27D, 27B rendered negative and positive, respectively, as shown in FIG. 7B, controller 41 detects point C1 as the pressed position. In other words, pressed position C1 obtained by the application of the voltage in the X direction and pressed position C1 obtained by the application of the voltage in the Y direction are detected as the same.

In this case, controller 41 subsequently applies a voltage with the polarity of the voltage along, for example, the X direction reversed as shown in FIG. 7C and detects point C2, which is located contact resistance Rs away in a lower-left direction from upper-left point C, as the pressed position. In other words, controller 41 applies the voltage with electrodes 27D, 27B rendered positive and negative, respectively, and detects, as the pressed position, point C2 located contact resistance Rs away in the lower-left direction from upper-left point C.

Thereafter, controller 41 detects, as the press angle which the pressed position makes, a mean value of angle θ+α which point C1, detected by the application of the voltage in the Y direction, forms an angle θ−α which point C2, detected by the application of the voltage with the polarity along the X direction reversed, forms. In other words, controller 41 performs precise detection of angle θ which point C forms as the press angle which the pressed position forms, by eliminating an angle error equivalent to contact resistance Rs.

As described above, the press angle is preferably detected again by applying the voltage with the polarity of the voltage along the X or Y direction reversed. Controller 41 can thus detect, with higher precision, the press angle which every pressed position makes, without being affected by contact resistance Rs.

In cases where no contact resistance Rs is caused, the angle obtained by the application of the voltage in the X direction becomes the same as the angle obtained by the application of the voltage in the Y direction. In this case, as mentioned above, the voltage is applied with the polarity of the voltage along the X or Y direction reversed for another detection of the press angle. Consequently, the correct press angle can be obtained.

In the first and second embodiments, operating member 28 bows resistive sheet 25 to bring resistor 26 into contact with conductor 22. However, the positions of the resistor and conductor may be reversed to allow a sheet formed with the conductor to be bowed to come into contact with the resistor. Or a planar pad or the like may be used in place of operating member 28 to allow the user to directly bow resistive sheet 25 with the finger or the like.

As described above, the input device of the present invention performs highly precise detection of the press angle which the pressed position makes whether the contact resistance is present or absent or whether the contact resistance is high or low.

What is claimed is:

1. An input device comprising:
   a ring-shaped resistor including:
     a pair of first electrodes provided along a first direction; and
     a pair of second electrodes provided along a second direction orthogonal to the first direction;
   a ring-shaped conductor facing the resistor across a clearance; and
   a controller, connected to the pair of first electrodes, the pair of second electrodes and the conductor, for successively applying a voltage between the first electrodes and between the second electrodes when the resistor and the conductor contact each other,
   wherein the controller determines an angular position of contact between the resistor and the conductor from one of:
     (A) a resultant vector of a vector that is directed in the first direction and detected based on a voltage output from the conductor when the voltage is applied between the first electrodes and a vector that is directed in the second direction and detected based on a voltage output from the conductor when the voltage is applied between the second electrodes; and
     (B) a mean value of an angle, which is obtained from the voltage output from the conductor when the voltage is applied between the first electrodes, and an angle, which is obtained from the voltage output from the conductor when the voltage is applied between the second electrodes.

2. The input device of claim 1, wherein the controller applies a voltage with polarity of the voltage along one of the pair of first electrodes and the pair of second electrodes reversed for detecting again the angle which the contact position between the resistor and the conductor makes.

3. The input device of claim 1, further comprising:
   an operating member which presses one of the resistor and the conductor for effecting a contact between the resistor and the conductor.

4. The input device of claim 3, wherein the operating member includes a projection for pressing the one of the resistor and the conductor.

5. A method for detecting a position of contact between a ring-shaped resistor and a ring-shaped conductor of an input device including the resistor and the conductor facing the resistor across a clearance, the method comprising the steps of:
   successively applying a voltage in a first direction of the resistor and in a second direction of the resistor that is orthogonal to the first direction when the resistor and the conductor contact each other; and
   determining an angular position of contact between the resistor and the conductor from one of:
     (A) a resultant vector of a vector that is directed in the first direction and detected based on a voltage output from the conductor when the voltage is applied in the first direction and a vector that is directed in the second direction and detected based on a voltage output from the conductor when the voltage is applied in the second direction; and (B) a mean value of an angle, which is obtained from the voltage output from the conductor when the voltage is applied in the first direction, and an angle, which is obtained from the voltage output from the conductor when the voltage is applied in the second direction.

* * * * *